(12) United States Patent
Joo et al.

(10) Patent No.: US 11,550,375 B2
(45) Date of Patent: Jan. 10, 2023

(54) STORAGE SYSTEM AND OPERATING METHOD THEREOF

(71) Applicant: SK hynix Inc., Gyeonggi-do (KR)

(72) Inventors: Yong Joon Joo, Gyeonggi-do (KR); Ku Ik Kwon, Gyeonggi-do (KR); Kyeong Seok Kim, Gyeonggi-do (KR); Byong Woo Ryu, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 5 days.

(21) Appl. No.: 17/231,499

(22) Filed: Apr. 15, 2021

(65) Prior Publication Data
US 2022/0164012 A1    May 26, 2022

(30) Foreign Application Priority Data
Nov. 25, 2020  (KR) .................. 10-2020-0159453

(51) Int. Cl.
   *G06F 1/20*    (2006.01)
(52) U.S. Cl.
   CPC .................... *G06F 1/206* (2013.01)
(58) Field of Classification Search
   CPC .............................. G06F 1/206; G01K 1/026
   See application file for complete search history.

(56) References Cited

U.S. PATENT DOCUMENTS

| | | | |
|---|---|---|---|
| 8,304,698 B1 * | 11/2012 | Tischler | G06F 1/206 219/494 |
| 2007/0191993 A1 * | 8/2007 | Wyatt | G11C 5/00 257/E23.08 |
| 2009/0171513 A1 * | 7/2009 | Tsukazawa | G06F 1/206 700/300 |
| 2016/0062421 A1 * | 3/2016 | Sugawara | G06F 1/3268 700/299 |
| 2019/0004723 A1 * | 1/2019 | Li | G06F 3/0634 |
| 2019/0025784 A1 * | 1/2019 | Yum | G05B 19/042 |
| 2020/0050246 A1 * | 2/2020 | Karalnik | G06F 1/206 |
| 2021/0278887 A1 * | 9/2021 | Lee | G06F 1/206 |
| 2022/0026967 A1 * | 1/2022 | Gu | G06F 1/206 |
| 2022/0121254 A1 * | 4/2022 | Chen | G06F 1/3206 |

FOREIGN PATENT DOCUMENTS

| | | |
|---|---|---|
| KR | 10-2019-0048078 | 5/2019 |
| KR | 10-2020-0016785 | 2/2020 |

* cited by examiner

*Primary Examiner* — Chun Cao
(74) *Attorney, Agent, or Firm* — IP & T Group LLP

(57) ABSTRACT

Embodiments of the present disclosure relate to a storage system and an operating method thereof. According to the embodiments of the present disclosure, the storage system may include N (N is a natural number) temperature sensors and M (M is a natural number of 2 or more) modules, and may determine a thermal throttling level for each of the M modules based on N temperature information pieces collected from the N temperature sensors and N weights corresponding to the N temperature sensors, wherein the N weights are different for each of the M modules, and the storage system may perform the thermal throttling for the M modules based on the thermal throttling levels for the M modules respectively.

11 Claims, 13 Drawing Sheets

FIG. 7
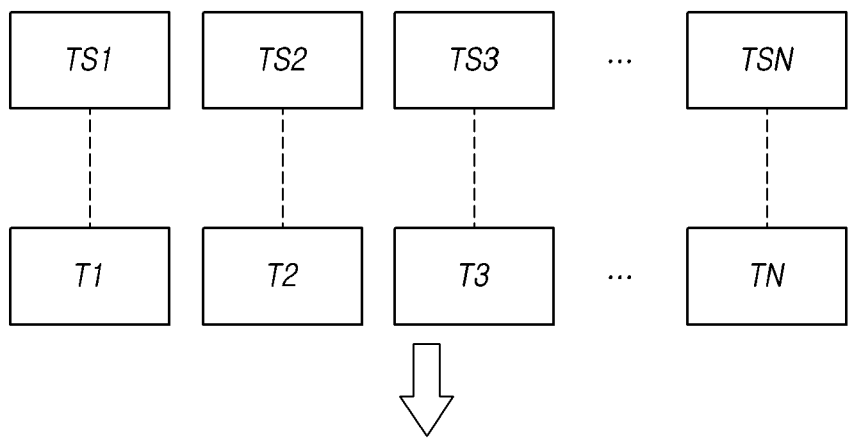
$CS_1 = T_1 * w_{11} + T_2 * w_{12} + T_3 * w_{13} + .. + T_N * w_{1N}$
$CS_2 = T_1 * w_{21} + T_2 * w_{22} + T_3 * w_{23} + .. + T_N * w_{2N}$
$CS_3 = T_1 * w_{31} + T_2 * w_{32} + T_3 * w_{33} + .. + T_N * w_{3N}$
...
$CS_M = T_1 * w_{M1} + T_2 * w_{M2} + T_3 * w_{M3} + .. + T_N * w_{MN}$
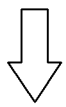
Set thermal throttling level using $CS_1, CS_2, CS_3, CS_M$
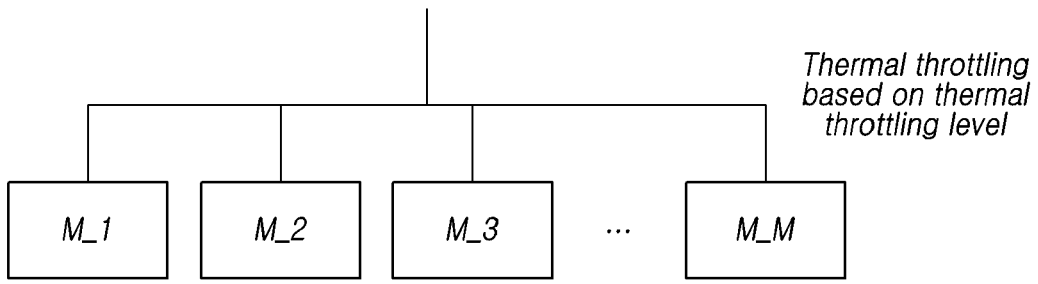
Thermal throttling based on thermal throttling level

FIG.9

| Thermal conductivity (M_1) | | | | | |
|---|---|---|---|---|---|
| Temperature (M_1) | 60 | 65 | 70 | 75 | 80 |
| Temperature (TS1) | 50 | 55 | 60 | 65 | 70 |
| Temperature (TS2) | 40 | 45 | 50 | 55 | 60 |
| Temperature (TS3) | 45 | 49 | 52 | 56 | 62 |
| ... | ... | ... | ... | ... | ... |
| Temperature (TSN) | 48 | 51 | 54 | 58 | 63 |

$$V = CS_1, CS_2, CS_3 \ldots, CS_M$$

| Thermal throttling | | | | | |
|---|---|---|---|---|---|
| Throttling level | 0 | 1 | 2 | 3 | 4 |
| range | V < V1 | V1 <= V < V2 | V2 <= V < V3 | V3 <= V < V4 | V4 <= V |

FIG.11

| Thermal throttling | | | | | |
|---|---|---|---|---|---|
| Throttling level | 0 | 1 | 2 | 3 | 4 |
| range (CS1) | V < V11 | V11 <= V < V12 | V12 <= V < V13 | V13 <= V < V14 | V14 <= V |
| range (CS2) | V < V21 | V21 <= V < V22 | V22 <= V < V23 | V23 <= V < V24 | V24 <= V |
| range (CS3) | V < V31 | V31 <= V < V32 | V32 <= V < V33 | V33 <= V < V34 | V34 <= V |
| ... | ... | ... | ... | ... | ... |
| range (CSM) | V < VM1 | VM1 <= V < VM2 | VM2 <= V < VM3 | VM3 <= V < VM4 | VM4 <= V |

STORAGE SYSTEM AND OPERATING METHOD THEREOF

CROSS-REFERENCE TO RELATED APPLICATION

The present application claims priority under 35 U.S.C. 119(a) to Korean patent application number 10-2020-0159453 filed on Nov. 25, 2020, which is incorporated herein by reference in its entirety.

BACKGROUND

1. Technical Field

The embodiments relate to a storage system and an operating method thereof.

2. Related Art

A memory system includes a data storage device that stores data on the basis of a request from a host, such as a computer, servers, a smartphone, a tablet PC, or other electronic devices. Examples of the memory system span from a traditional magnetic-disk-based hard disk drive (HDD) to a semiconductor-based data storage device such as a solid state drive (SSD), a universal flash storage device (UFS), or an embedded MMC (eMMC) device.

The memory system may further include a memory controller for controlling the memory device. The memory controller may receive a command from the host and, on the basis of the received command, may execute the command or control read/write/erase operations on the memory devices in the memory system. The memory controller may be used to execute firmware operations for performing a logical operation for controlling such operations.

In the storage system based on such a memory system, an internal temperature may increase in the process of executing the above-described operations. Accordingly, the storage system is required to adjust the internal temperature to be below a certain level in order to prevent errors due to the rapid increase of the temperature.

SUMMARY

Embodiments of the disclosure may provide a storage system and an operating method thereof capable of efficiently performing the thermal throttling.

In addition, embodiments of the disclosure may provide a storage system and an operating method thereof capable of minimizing performance degradation occurring during the thermal throttling process.

In one aspect, embodiments of the disclosure may provide a storage system including N (N is natural number) temperature sensors, M (M is natural number of 2 or more) modules and a temperature handler circuit for performing thermal throttling for the M modules.

The temperature handler circuit may determine a thermal throttling level for each of the M modules based on N temperature information pieces collected from the N temperature sensors and N weights corresponding to the N temperature sensors—the N weights different for each of the M modules.

The temperature handler circuit may perform the thermal throttling for the M modules based on the thermal throttling levels for the M modules, respectively.

In another aspect, embodiments of the disclosure may provide an operating method for the storage system including N (N is natural number) temperature sensors and M (M is natural number of 2 or more) modules.

The operating method of the storage system may include collecting N temperature information pieces from the N temperature sensors.

The operating method of the storage system may include determining a thermal throttling level for each of the M modules based on N temperature information pieces and N weights corresponding to the N temperature sensors, wherein the N weights are different for each of the M modules.

The operating method of the storage system may include performing the thermal throttling for the M modules based on the thermal throttling levels for the M modules, respectively.

In another aspect, embodiments of the disclosure may provide a system including modules respectively disposed at physical locations.

The system may include N temperature sensors respectively disposed at physical locations and each suitable for generating a temperature information piece by sensing temperatures of the modules.

The system may include a thermal throttling controller suitable for performing a thermal throttling operation on a selected one of the modules based on the N temperature information pieces and N weights for the selected module.

Each of the N weights are determined according to a pair of distance and thermal conductivity between the selected module and a corresponding one of the N temperature sensors, where N is a natural number.

According to the embodiments of the disclosure, it is possible to efficiently perform thermal throttling and minimize performance degradation that occurs during the thermal throttling process by intensively performing thermal throttling for the module having a high correlation with heat generation.

BRIEF DESCRIPTION OF THE DRAWINGS

FIG. 7 is a diagram illustrating another example in which the storage system according to embodiments of the present disclosure determines the thermal throttling level of M modules.

FIG. 9 is a diagram illustrating an example of determining thermal conductivities between the first module and respective N temperature sensors in FIG. 8.

FIG. 11 is a diagram illustrating another example of determining the thermal throttling level for each module in FIG. 7.

DETAILED DESCRIPTION

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily to the same embodiment(s). The term "embodiments" when used herein does not necessarily refer to all embodiments.

Figure 1:
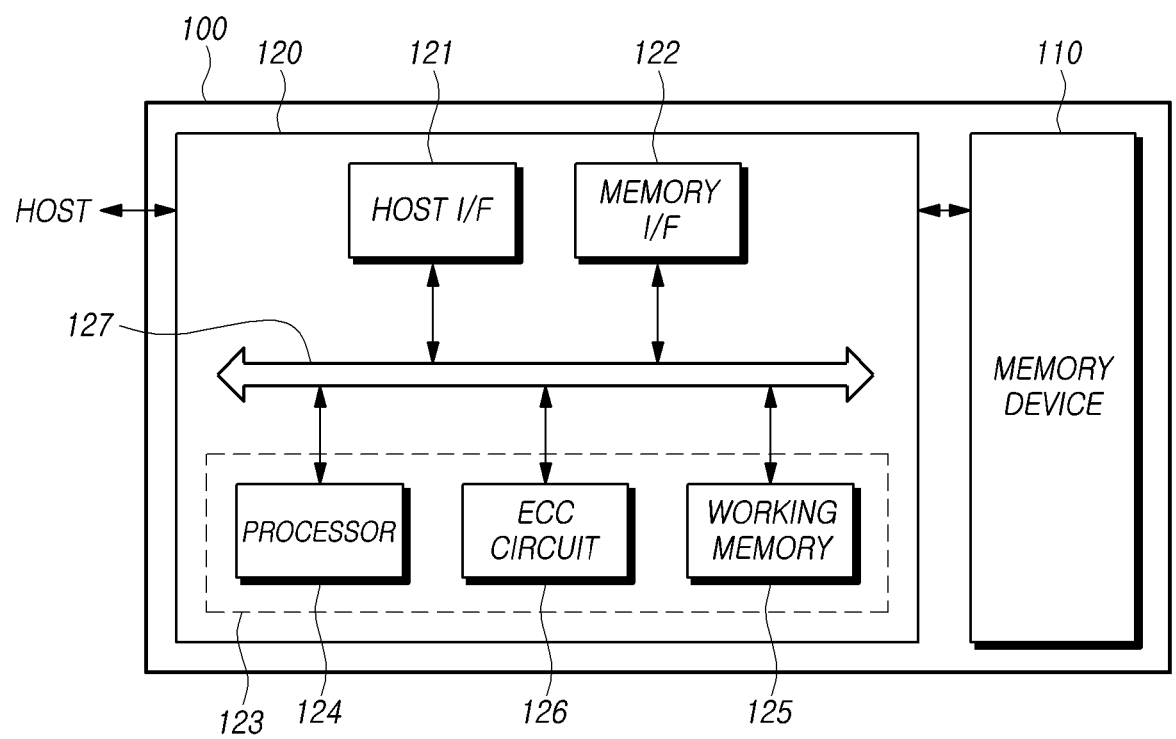
FIG. 1 is a schematic diagram illustrating a configuration of a memory system based on an embodiment of the disclosed technology.

FIG. 1 is a diagram illustrating the schematic configuration of a memory system 100 based on an embodiment of the disclosed technology.

In some implementations, the memory system 100 may include a memory device 110 configured to store data, and a memory controller 120 configured to control the memory device 110.

The memory device 110 may include multiple memory blocks each including a plurality of memory cells for storing data. The memory device 110 may be configured to operate in response to control signals received from the memory controller 120. Operations of the memory device 110 may include, for example, a read operation, a program operation (also referred to as a "write operation"), an erasure operation, and the like.

The memory cells in the memory device 110 are used to store data and may be arranged in a memory cell array. The memory cell array may be divided into memory blocks of memory cells and each block includes different pages of memory cells. In typical implementations of NAND flash memory devices, a page of memory cells is the smallest memory unit that can be programmed or written, and the data stored in memory cells can be erased at the block level.

In some implementations, the memory device 110 may be implemented as various types, such as a double data rate synchronous dynamic random access memory (DDR SDRAM), a low power double data rate4 (LPDDR4) SDRAM, a graphics double data rate (GDDR) SDRAM, a low power DDR (LPDDR), a rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), or a spin transfer torque random access memory (STT-RAM).

The memory device 110 may be implemented in a three-dimensional array structure. Some embodiments of the disclosed technology are applicable to any type of flash memory devices having an electric charge storage layer. In an implementation, the electric charge storage layer may be formed of a conductive material, and such an electric charge storage layer can be called a floating gate. In another implementation, the electric charge storage layer may be formed of an insulating material, and such a flash memory device can be called a charge trap flash (CTF).

The memory device 110 may be configured to receive a command and an address from the memory controller 120 to access an area of the memory cell array selected using the address. That is, the memory device 110 may perform an operation corresponding to the received command on a memory area of the memory device having a physical address corresponding to the received address from the memory controller 120.

In some implementations, the memory device 110 may perform a program operation, a read operation, an erasure operation, and the like. During the program operation, the memory device 110 may write data in the area selected by the address. During the read operation, the memory device 110 may read data from a memory area selected by the address. During the erasure operation, the memory device 110 may erase data stored in a memory area selected by the address.

The memory controller 120 may control write (program), read, erasure, and background operations that are performed on the memory device 110. The background operation may include, for example, operations that are implemented to optimize the overall performance of the memory device 110, such as a garbage collection operation (GC), a wear leveling (WL) operation, and a bad block management (BBM) operation.

The memory controller 120 may control the operation of the memory device 110 at the request of a host. Alternatively, the memory controller 120 may control the operation of the memory device 110 even in absence of a request from the host when it performs such background operations of the memory device.

The memory controller 120 and the host may be separate devices. In some implementations, the memory controller 120 and the host may be integrated and implemented as a single device. In the following description, the memory controller 120 and the host will be discussed as separate devices as an example.

Referring to FIG. 1, the memory controller 120 may include a memory interface 122, a control circuit 123, and a host interface 121.

The host interface 121 may be configured to provide an interface for communication with the host.

When receiving a command from the host HOST, the control circuit 123 may receive the command through the host interface 121 and may perform an operation of processing the received command.

The memory interface 122 may be directly or indirectly connected to the memory device 110 to provide an interface for communication with the memory device 110. That is, the memory interface 122 may be configured to provide the memory device 110 and the memory controller 120 with an interface for the memory controller 120 to perform memory operations on the memory device 110 based on control signals and instructions from the control circuit 123.

The control circuit 123 may be configured to control the operation of the memory device 110 through the memory controller 120. For example, the control circuit 123 may include a processor 124 and a working memory 125. The control circuit 123 may further include an error detection/correction circuit (ECC circuit) 126 and the like.

The processor 124 may control the overall operation of the memory controller 120. The processor 124 may perform a logical operation. The processor 124 may communicate with the host HOST through the host interface 121. The processor 124 may communicate with the memory device 110 through the memory interface 122.

The processor 124 may be used to perform operations associated with a flash translation layer (FTL) to effectively manage the memory operations on the memory system 100. The processor 124 may translate a logical block address (LBA) provided by the host into a physical block address (PBA) through the FTL. The FTL may receive the LBA and translate the LBA into the PBA by using a mapping table.

There are various address mapping methods which may be employed by the FTL, based on the mapping unit. Typical address mapping methods may include a page mapping method, a block mapping method, and a hybrid mapping method.

The processor 124 may be configured to randomize data received from the host to write the randomized data to the memory cell array. For example, the processor 124 may randomize data received from the host by using a randomizing seed. The randomized data is provided to the memory device 110 and written to the memory cell array.

The processor 124 may be configured to derandomize data received from the memory device 110 during a read operation. For example, the processor 124 may derandomize data received from the memory device 110 by using a derandomizing seed. The derandomized data may be output to the host HOST.

The processor 124 may execute firmware (FW) to control the operation of the memory controller 120. The processor 124 may control the overall operation of the memory controller 120 and, in order to perform a logical operation, may execute (drive) firmware loaded into the working memory 125 during booting.

The firmware refers to a program or software stored on a certain nonvolatile memory and is executed inside the memory system 100.

In some implementations, the firmware may include various functional layers. For example, the firmware may include at least one of a flash translation layer (FTL) configured to translate a logical address in the host HOST requests to a physical address of the memory device 110, a host interface layer (HIL) configured to interpret a command that the host HOST issues to a data storage device such as the memory system 100 and to deliver the command to the FTL, and a flash interface layer (FIL) configured to deliver a command issued by the FTL to the memory device 110.

For example, the firmware may be stored in the memory device 110, and then loaded into the working memory 125.

The working memory 125 may store firmware, program codes, commands, or pieces of data necessary to operate the memory controller 120. The working memory 125 may include, for example, at least one among a static RAM (SRAM), a dynamic RAM (DRAM), and a synchronous RAM (SDRAM) as a volatile memory.

The error detection/correction circuit 126 may be configured to detect and correct one or more erroneous bits in the data by using an error detection and correction code. In some implementations, the data that is subject to the error detection and correction may include data stored in the working memory 125, and data retrieved from the memory device 110.

The error detection/correction circuit 126 may be implemented to decode data by using the error correction code. The error detection/correction circuit 126 may be implemented by using various decoding schemes. For example, a decoder that performs nonsystematic code decoding or a decoder that performs systematic code decoding may be used.

In some implementations, the error detection/correction circuit 126 may detect one or more erroneous bits on a sector basis. That is, each piece of read data may include multiple sectors. In this patent document, a sector may refer to a data unit that is smaller than the read unit (e.g., page) of a flash memory. Sectors constituting each piece of read data may be mapped based on addresses.

In some implementations, the error detection/correction circuit 126 may calculate a bit error rate (BER) and determine whether the number of erroneous bits in the data is within the error correction capability sector by sector. For example, if the BER is higher than a reference value, the error detection/correction circuit 126 may determine that the erroneous bits in the corresponding sector are uncorrectable and the corresponding sector is marked "fail." If the BER is lower than or equal to the reference value, the error detection/correction circuit 126 may determine that the corresponding sector is correctable or the corresponding sector can be marked "pass."

The error detection/correction circuit 126 may perform error detection and correction operations successively on all read data. When a sector included in the read data is correctable, the error detection/correction circuit 126 may move on to the next sector to check as to whether an error correction operation is needed on the next sector. Upon completion of the error detection and correction operations on all the read data in this manner, the error detection/correction circuit 126 may acquire information as to which sector is deemed uncorrectable in the read data. The error detection/correction circuit 126 may provide such information (e.g., address of uncorrectable bits) to the processor 124.

The memory system 100 may also include a bus 127 to provide a channel between the constituent elements 121, 122, 124, 125, and 126 of the memory controller 120. The bus 127 may include, for example, a control bus for delivering various types of control signals and commands, and a data bus for delivering various types of data.

By way of example, FIG. 1 illustrates the above-mentioned constituent elements 121, 122, 124, 125, and 126 of the memory controller 120. It is noted that some of those elements illustrated in the drawings may be omitted, or some of the above-mentioned constituent elements 121, 122, 124, 125, and 126 of the memory controller 120 may be integrated into a single element. In addition, in some implementations, one or more other constituent elements may be added to the above-mentioned constituent elements of the memory controller 120.

Figure 2:
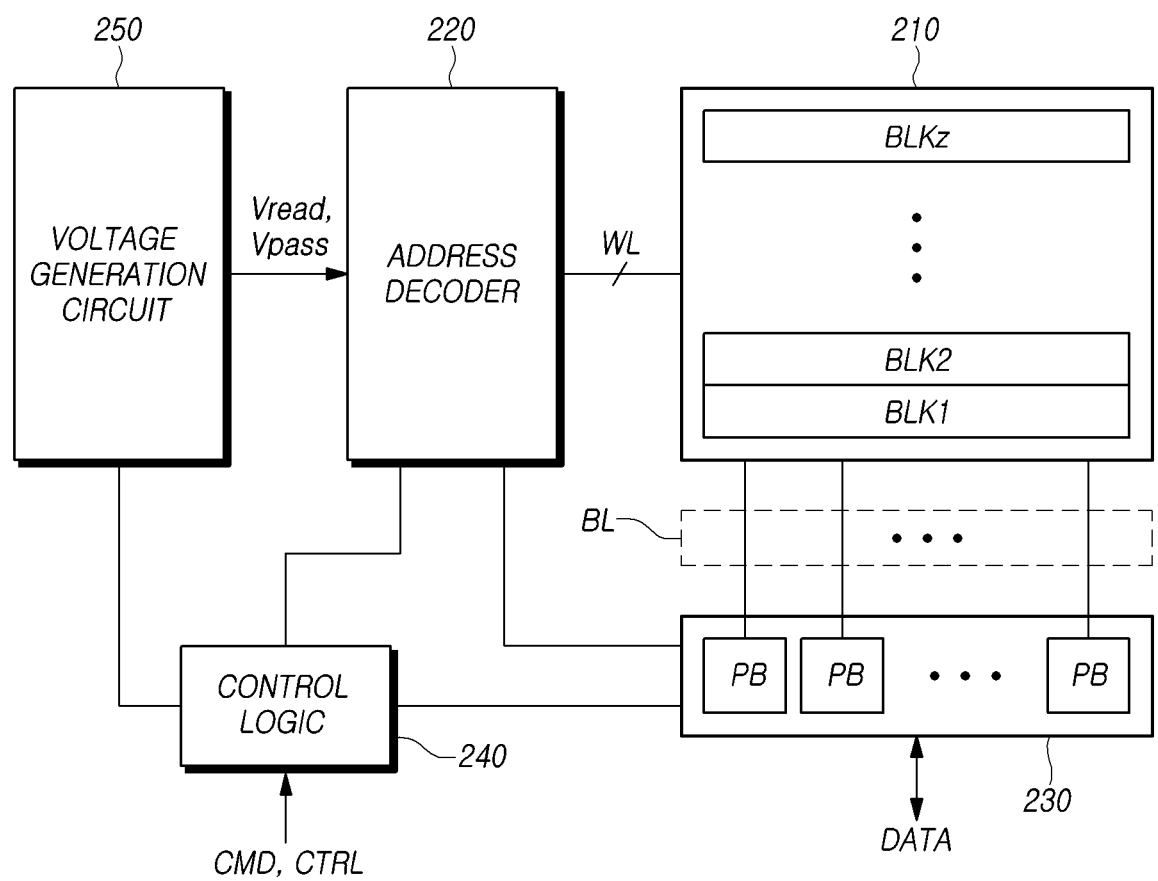
FIG. 2 is a block diagram schematically illustrating a memory device based on an embodiment of the disclosed technology.

FIG. 2 is a block diagram schematically illustrating a memory device 110 based on an embodiment of the disclosed technology.

In some implementations, the memory device 110 based on an embodiment of the disclosed technology may include a memory cell array 210, an address decoder 220, a read/write circuit 230, a control logic 240, and a voltage generation circuit 250.

The memory cell array 210 may include multiple memory blocks BLK1-BLKz, where z is a natural number equal to or larger than 2.

In the multiple memory blocks BLK1-BLKz, multiple word lines WL and multiple bit lines BL may be disposed in rows and columns, and multiple memory cells MC may be arranged.

The multiple memory blocks BLK1-BLKz may be connected to the address decoder 220 through the multiple word lines WL. The multiple memory blocks BLK1-BLKz may be connected to the read/write circuit 230 through the multiple bit lines BL.

Each of the multiple memory blocks BLK1-BLKz may include multiple memory cells. For example, the multiple memory cells are nonvolatile memory cells. In some implementations, such nonvolatile memory cells may be arranged in a vertical channel structure.

The memory cell array 210 may be configured as a memory cell array having a two-dimensional structure. In some implementations, the memory cell array 210 may be arranged in a three-dimensional structure.

Each of the multiple memory cells included in the memory cell array 210 may store at least one bit of data. For example, each of the multiple memory cells included in the memory cell array 210 may be a single-level cell (SLC) configured to store one bit of data. As another example, each of the multiple memory cells included in the memory cell array 210 may be a multi-level cell (MLC) configured to store two bits of data per memory cell. As another example, each of the multiple memory cells included in the memory cell array 210 may be a triple-level cell (TLC) configured to store three bits of data per memory cell. As another example, each of the multiple memory cells included in the memory cell array 210 may be a quad-level cell (QLC) configured to store four bits of data per memory cell. As another example, the memory cell array 210 may include multiple memory cells, each of which may be configured to store at least five bits of data per memory cell.

Referring to FIG. 2, the address decoder 220, the read/write circuit 230, the control logic 240, and the voltage generation circuit 250 may operate as peripheral circuits configured to drive the memory cell array 210.

The address decoder 220 may be connected to the memory cell array 210 through the multiple word lines WL.

The address decoder 220 may be configured to operate in response to command and control signals of the control logic 240.

The address decoder 220 may receive addresses through an input/output buffer inside the memory device 110. The address decoder 220 may be configured to decode a block address among the received addresses. The address decoder 220 may select at least one memory block based on the decoded block address.

The address decoder 220 may receive a read voltage Vread and a pass voltage Vpass from the voltage generation circuit 250.

The address decoder 220 may, during a read operation, apply the read voltage Vread to a selected word line WL inside a selected memory block and apply the pass voltage Vpass to the remaining non-selected word lines WL.

The address decoder 220 may apply a verification voltage generated by the voltage generation circuit 250 to a selected word line WL inside a selected memory block, during a program verification operation, and may apply the pass voltage Vpass to the remaining non-selected word lines WL.

The address decoder 220 may be configured to decode a column address among the received addresses. The address decoder 220 may transmit the decoded column address to the read/write circuit 230.

The memory device 110 may perform the read operation and the program operation page by page. Addresses received when the read operation and the program operation are requested may include at least one of a block address, a row address, and a column address.

The address decoder 220 may select one memory block and one word line based on the block address and the row address. The column address may be decoded by the address decoder 220 and provided to the read/write circuit 230.

The address decoder 220 may include at least one of a block decoder, a row decoder, a column decoder, and an address buffer.

The read/write circuit 230 may include multiple page buffers PB. The read/write circuit 230 may operate as a "read circuit" when the memory cell array 210 performs a read operation, and may operate as a "write circuit" when the memory cell array 210 performs a write operation.

The above-mentioned read/write circuit 230 is also referred to as a page buffer circuit including multiple page buffers PB, or a data register circuit. The read/write circuit 230 may include a data buffer that participates in a data processing function and, in some implementations, may further include a cache buffer for data caching.

The multiple page buffers PB may be connected to the memory cell array 210 through the multiple bit lines BL. In order to detect or sense the threshold voltage Vth of the memory cells during a read operation and a program verification operation, the multiple page buffers PB may continuously supply a sensing current to the bit lines BL connected to the memory cells to detect, at a sensing node, a change proportional to the amount of current that varies depending on the program state of a corresponding memory cell, and may hold or latch the corresponding voltage as sensing data.

The read/write circuit 230 may operate in response to page buffer control signals output from the control logic 240.

During a read operation, the read/write circuit 230 senses a voltage value of a memory cell and the voltage value is read out as data. The read/write circuit 230 temporarily stores the retrieved data, and outputs the data DATA to the input/output buffer of the memory device 110. In an embodiment, the read/write circuit 230 may include a column selection circuit, in addition to the page buffers PB or page registers.

The control logic 240 may be connected to the address decoder 220, the read/write circuit 230, and the voltage generation circuit 250. The control logic 240 may receive a command CMD and a control signal CTRL through the input/output buffer of the memory device 110.

The control logic 240 may be configured to control the overall operation of the memory device 110 in response to the control signal CTRL. The control logic 240 may output a control signal for adjusting the voltage level of sensing nodes of multiple page buffers PB to a pre-charge voltage level.

The control logic 240 may control the read/write circuit 230 to perform a read operation in the memory cell array 210. The voltage generation circuit 250 may generate a read voltage Vread and a pass voltage Vpass, which are used during the read operation, in response to a voltage generation circuit control signal output from the control logic 240.

A memory block BLK included in the memory device 110 may include multiple pages PG. In some implementations, a plurality of memory cells arranged in columns form memory cell strings, and a plurality of memory cells arranged in rows form memory blocks. Each of the multiple pages PG is coupled to one of word lines WL, and each of the memory cell strings STR is coupled to one of bit lines BL.

In the memory block BLK, multiple word lines WL and multiple bit lines BL may be arranged in rows and columns. For example, each of the multiple word lines WL may be arranged in the row direction, and each of the multiple bit lines BL may be arranged in the column direction. As another example, each of the multiple word lines WL may be arranged in the column direction, and each of the multiple bit lines BL may be arranged in the row direction.

In some implementations, the multiple word lines WL and the multiple bit lines BL may intersect with each other, thereby addressing a single memory cell in the array of multiple memory cells MC. In some implementations, each memory cell MC may include a transistor TR that includes a material layer that can hold an electrical charge.

For example, the transistor TR arranged in each memory cell MC may include a drain, a source, and a gate. The drain (or source) of the transistor TR may be connected to the corresponding bit line BL directly or via another transistor TR. The source (or drain) of the transistor TR may be connected to the source line (which may be the ground) directly or via another transistor TR. The gate of the transistor TR may include a floating gate (FG) surrounded by an insulator, and a control gate (CG) to which a gate voltage is applied from a word line WL.

In each of the multiple memory blocks BLK1-BLKz, a first selection line (also referred to as a source selection line or a drain selection line) may be additionally arranged outside the first outermost word line, which is closer to the read/write circuit 230 among two outermost word lines, and a second selection line (also referred to as a drain selection line or a source selection line) may be additionally arranged outside the other second outermost word line.

In some implementations, at least one dummy word line may be additionally arranged between the first outermost word line and the first selection line. In addition, at least one dummy word line may be additionally arranged between the second outermost word line and the second selection line.

A read operation and a program operation (write operation) of the memory block may be performed page by page, and an erasure operation may be performed memory block by memory block.

Figure 3:
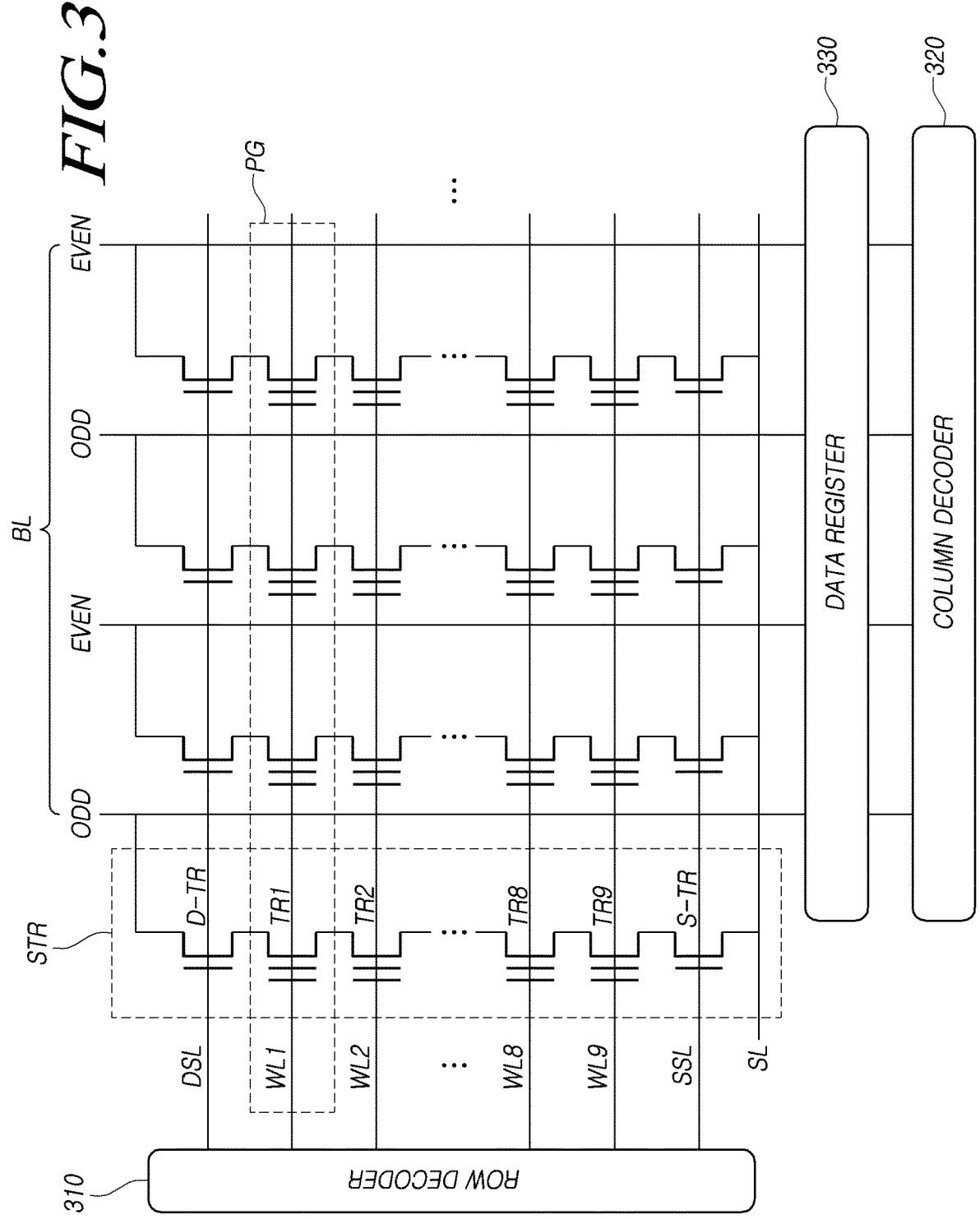
FIG. 3 is a diagram illustrating a structure of word lines and bit lines of a memory device based on an embodiment of the disclosed technology.

FIG. 3 is a diagram illustrating a structure of word lines WL and bit lines BL of a memory device 110 based on an embodiment of the disclosed technology.

Referring to FIG. 3, the memory device 110 has a core area in which memory cells MC are arranged, and an auxiliary area (the remaining area other than the core area) to include circuitry that is used to perform the operations of the memory cell array 210.

In the core area, a certain number of memory cells arranged in one direction can be called "page" PG, and a certain number of memory cells that are coupled in series can be called "memory cell string" STR.

The word lines WL1-WL9 may be connected to a row decoder 310. The bit lines BL may be connected to a column decoder 320. A data register 330, which corresponds to the read/write circuit 230 of FIG. 2, may exist between the multiple bit lines BL and the column decoder 320.

The multiple word lines WL1-WL9 may correspond to multiple pages PG.

For example, each of the multiple word lines WL1-WL9 may correspond to one page PG as illustrated in FIG. 3. When each of the multiple word lines WL1-WL9 has a large size, each of the multiple word lines WL1-WL9 may correspond to at least two (e.g., two or four) pages PG. Each page PG is the smallest unit in a program operation and a read operation, and all memory cells MC within the same page PG may perform simultaneous operations when conducting a program operation and a read operation.

The multiple bit lines BL may be connected to the column decoder 320. In some implementations, the multiple bit lines BL may be divided into odd-numbered bit lines BL and even-numbered bit lines BL such that a pair of odd-numbered bit line and even-numbered bit line is coupled in common to a column decoder 320.

In accessing a memory cell MC, the row decoder 310 and the column decoder 320 are used to locate a desired memory cell based on the address.

In some implementations, the data register 330 plays an important role because all data processing by the memory device 110, including program and read operations, occurs via the data register 330. If data processing by the data register 330 is delayed, all of the other areas need to wait until the data register 330 finishes the data processing, degrading the overall performance of the memory device 110.

Referring to the example illustrated in FIG. 3, in one memory cell string STR, multiple transistors TR1-TR9 may be connected to multiple word lines WL1-WL9, respectively. In some implementations, the multiple transistors TR1-TR9 correspond to memory cells MC. In this example, the multiple transistors TR1-TR9 include control gates CG and floating gates FG.

The multiple word lines WL1-WL9 include two outermost word lines WL10 and WL9. A first selection line DSL may be additionally arranged outside the first outermost word line WL1, which is closer to the data register 330 and has a shorter signal path compared to the other outermost word line WL9. A second selection line SSL may be additionally arranged outside the other second outermost word line WL9.

The first selection transistor D-TR, which is controlled to turn on/off by the first selection line DSL, has a gate electrode connected to the first selection line DSL, but includes no floating gate FG. The second selection transistor S-TR, which is controlled to turn on/off by the second selection line SSL, has a gate electrode connected to the second selection line SSL, but includes no floating gate FG.

The first selection transistor D-TR is used as a switch circuit that connects the corresponding memory cell string STR to the data register 330. The second selection transistor S-TR is used as a switch that connects the corresponding memory cell string STR to the source line SL. That is, the first selection transistor D-TR and the second selection transistor S-TR can be used to enable or disable the corresponding memory cell string STR.

In some implementations, the memory system 100 applies a predetermined turn-on voltage Vcc to the gate electrode of the first selection transistor D-TR, thereby turning on the first selection transistor D-TR, and applies a predetermined turn-off voltage (e.g., 0V) to the gate electrode of the second selection transistor S-TR, thereby turning off the second selection transistor S-TR.

The memory system 100 turns on both of the first and second selection transistors D-TR and S-TR during a read operation or a verification operation. Accordingly, during a read operation or a verification operation, an electric current may flow through the corresponding memory cell string STR and drain to the source line SL, which corresponds to the ground, such that the voltage level of the bit line BL can be measured. However, during a read operation, there may be a time difference in the on/off timing between the first selection transistor D-TR and the second selection transistor S-TR.

The memory system 100 may apply a predetermined voltage (e.g., +20V) to the substrate through a source line SL during an erasure operation. The memory system 100 applies a certain voltage to allow both the first selection transistor D-TR and the second selection transistor S-TR to float during an erasure operation. As a result, the applied erasure voltage can remove electrical charges from the floating gates FG of the selected memory cells.

Figure 4:
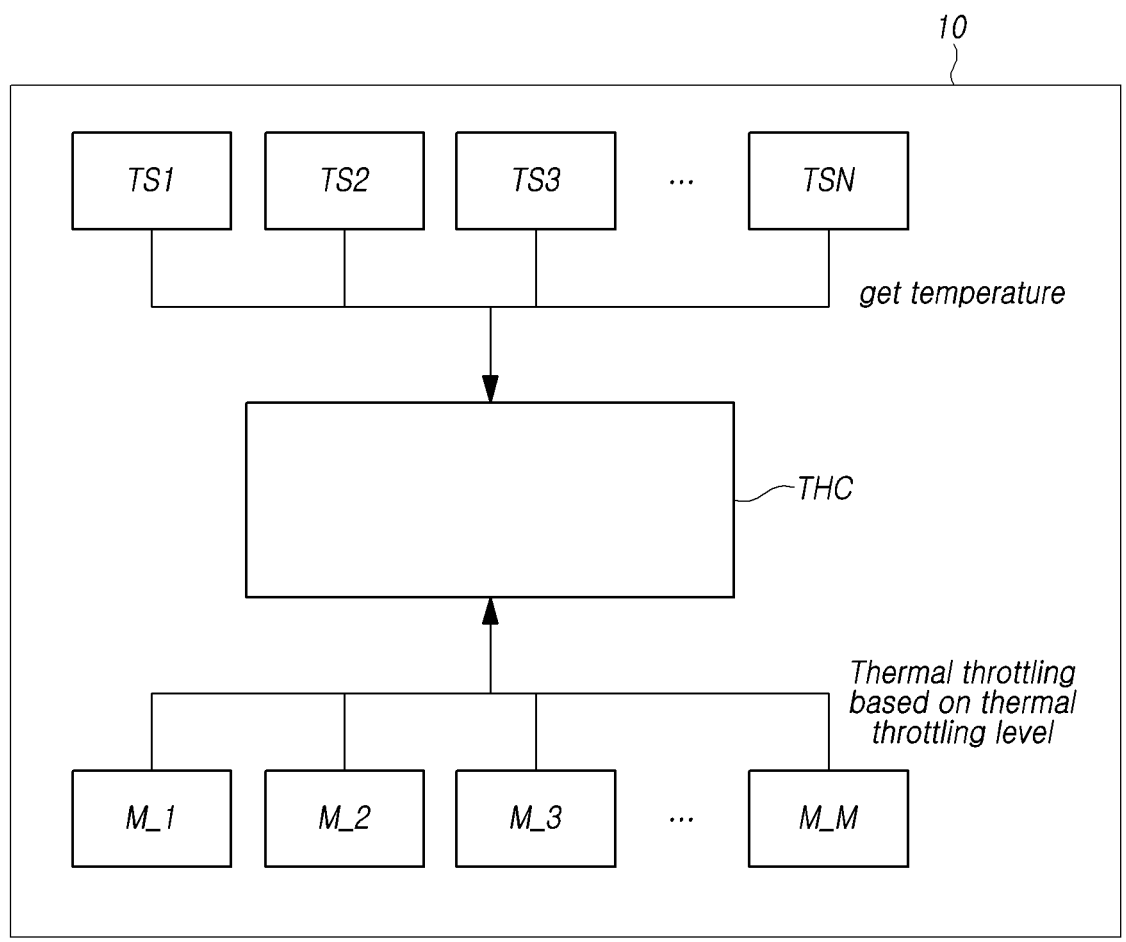
FIG. 4 is a schematic diagram of the storage system according to embodiments of the present disclosure.

FIG. 4 is a schematic diagram of the storage system 10 according to embodiments of the present disclosure.

Referring to FIG. 4, the storage system 10 may include N (N is a natural number) temperature sensors TS1 to TSN, and M (M is a natural number of 2 or more) modules M_1 to M_M, and a temperature handler circuit THC.

The temperature sensors TS1 to TSN may measure the temperature of a specific region inside the storage system 10 and transmit the measured temperature value to the temperature handler circuit THC. The temperature sensors TS1 to TSN may measure the temperature at every preset period, or may measure the temperature in real-time when a temperature change is detected.

The modules M_1 to M_M are hardware included in the storage system 10 and may perform a predetermined specific function.

The temperature handler circuit THC may perform thermal throttling for the M modules M_1 to M_M by using the N temperature sensors TS1 to TSN.

Specifically, the temperature handler circuit THC may determine the thermal throttling level for the M modules M_1 to M_M based on N temperature information pieces collected from N temperature sensors TS1 to TSN and N weights corresponding to the N temperature sensors TS1 to TSN.

Further, the temperature handler circuit THC may perform the thermal throttling for each of the M modules M_1 to M_M based on the thermal throttling level for each of the M modules M_1 to M_M. The performing of the thermal throttling for a module may mean the operation in which the operating speed of the module is lowered or the power supplied to the module is cut off in order to prevent malfunction and damage of the module that may occur due to a rapid increase in the temperature of the module. For example, the temperature handler circuit THC may lower the speed of a clock input to the module in order to lower the operating speed of the module or lower the level of the supply voltage.

This storage system 10 may be implemented by, for example, the memory system 100 described in FIG. 1. The module included in the storage system 10 may be a memory device 110 or a memory controller 120 included in the memory system 100. In addition, the modules included in the storage system 10 may be components constituting the memory device 100 or the memory controller 120 (e.g., host interface 121, memory interface 122, working memory 125, error detection and correction circuit 126, memory cell array 210, address decoder 220, a read-and-write circuit 230). Further, the temperature handler circuit THC included in the storage system 10 may be the processor 124 of the memory controller 120.

Hereinafter, the operation of the storage system 10 above will be described using a flowchart.

Figure 5:
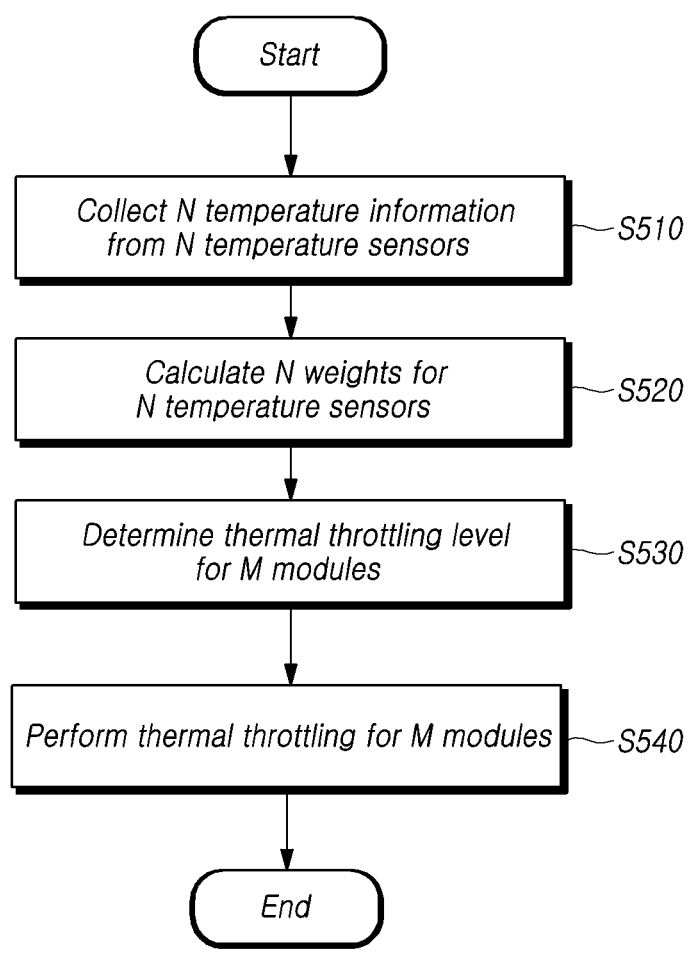
FIG. 5 is a flowchart illustrating the operation of the storage system according to embodiments of the present disclosure.

FIG. 5 is a flowchart illustrating the operation of the storage system 10 according to embodiments of the present disclosure.

Referring to FIG. 5, the temperature handler circuit THC of the storage system 10 may collect N temperature information pieces respectively from the N temperature sensors TS1 to TSN (S510). The temperature handler circuit THC may collect the N temperature information pieces 1) in real time, 2) every preset period, or 3) when an interrupt indicating temperature change occurs.

In addition, the temperature handler circuit THC may calculate N weights for the N temperature sensors TS1 to TSN (S520).

In addition, the temperature handler circuit THC may determine the thermal throttling level for each of the M modules M_1 to M_M based on the N temperature information pieces collected in operation S510 and the N weights calculated in operation S520 (S530).

The temperature handler circuit THC may perform the thermal throttling for M modules M_1 to M_M based on the thermal throttling level for the M modules M_1 to M_M determined in operation S530 (S540).

Hereinafter, an example will be described in which the storage system 10 determines the thermal throttling level of the M modules.

As an example, the temperature handler circuit THC may use the same N weights for all of the M modules M_1 to M_M to determine the thermal throttling level for all of M modules M_1 to M_M.

Figure 6:
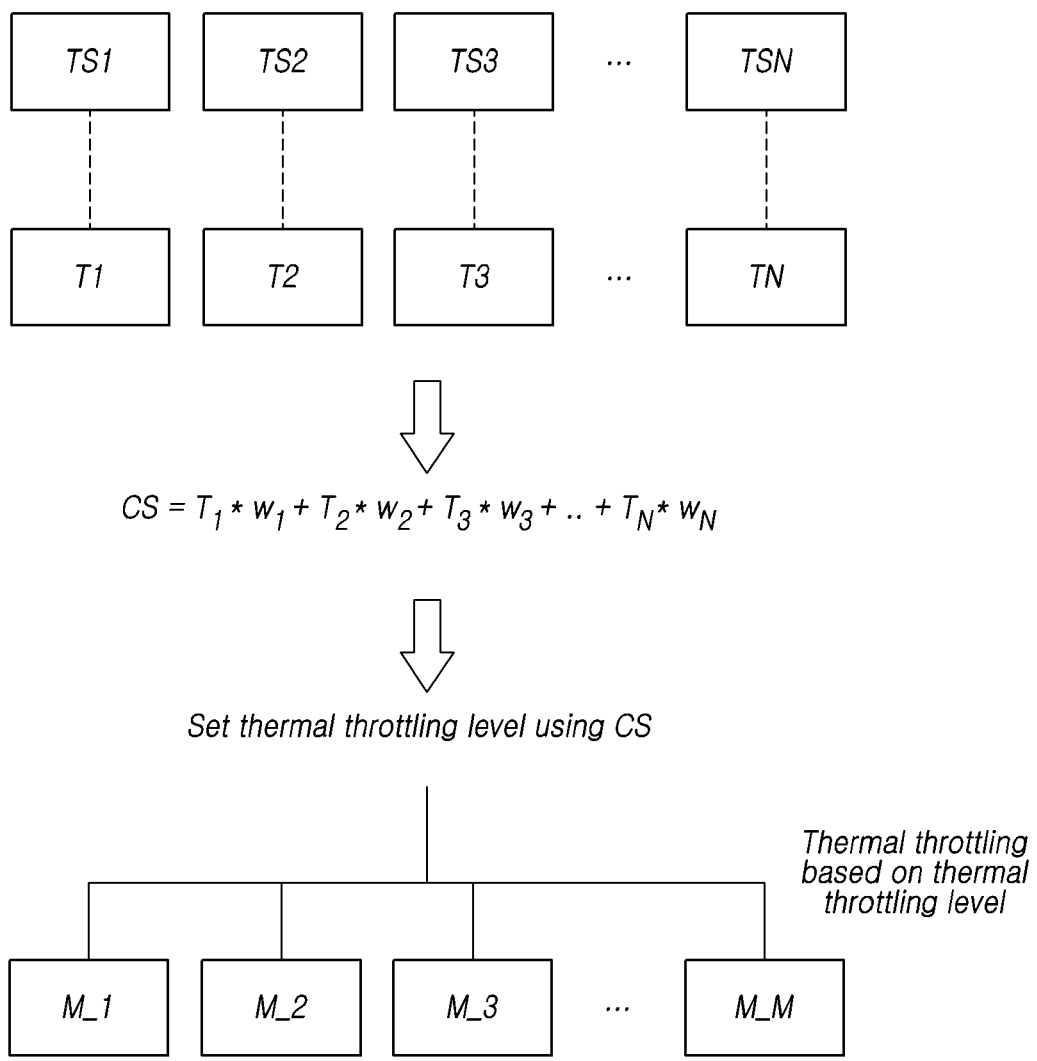
FIG. 6 is a diagram illustrating an example in which the storage system according to embodiments of the present disclosure determines the thermal throttling level of M modules.

FIG. 6 is a diagram illustrating an example in which the storage system 10 according to embodiments of the present disclosure determines the thermal throttling level of M modules.

Referring to FIG. 6, the temperature handler circuit THC of the storage system 10 may collect a total of N temperature information pieces T1 to TN, one each from the N temperature sensors TS1 to TSN. The temperature handler circuit THC may collect temperature information piece T1 measured by the temperature sensor TS1, temperature information piece T2 measured by the temperature sensor TS2, and the temperature information piece T3 measured by the temperature sensor TS3. The temperature handler circuit THC may collect temperature information pieces for the remaining temperature sensors in the same manner.

The temperature handler circuit THC may calculate a composite value CS by using the collected N temperature information pieces T1 to TN and a group of N weights $w_1$ to $w_N$ for all the M modules M_1 to M_M as in Equation 1 below.

$$CS=T_1*w_1+T_2*w_2+T_3*w_3+\ldots+T_N*w_N \qquad \text{[Equation 1]}$$

Furthermore, the temperature handler circuit THC may determine the thermal throttling level using the calculated composite value CS and may perform the thermal throttling for M modules M_1 to M_M based on the determined thermal throttling level.

The temperature handler circuit THC may determine the thermal throttling level using the composite value CS, so that all the N temperature information pieces T1 to TN respectively collected from the N temperature sensors TS1 to TSN may be used to determine the thermal throttling level for all the M modules M_1 to M_M. Therefore, the temperature handler circuit THC may increase the accuracy of the thermal throttling level which is a reference for performing thermal throttling.

In the case that the temperature handler circuit THC determines the single thermal throttling level using only one composite value CS, the single thermal throttle level may be determined for all the M modules M_1 to M_M.

Therefore, a limitation may occur in the temperature handler circuit THC performing efficient thermal throttling in consideration of the characteristics of each module. For example, if the value of the temperature information piece collected from one of the N temperature sensors TS1 to TSN is too high, the thermal throttling level for all modules may calculated to be high even if the values of the temperature information pieces collected from the remaining temperature sensors are low. Therefore, unnecessary thermal throttling may be performed. As another example, if the value of the temperature information piece collected from any of the N temperature sensors TS1 to TSN is too low, the thermal throttling level is calculated to be low. Therefore, there may be a problem in which thermal throttling does not operate normally even when the thermal throttling should be performed.

To solve this problem, as another example, the temperature handler circuit THC may use different groups of N weights for the respective M modules M_1 to M_M. A single group of N weights for each of the M modules M_1 to M_M may be used to determine the thermal throttling level for the corresponding one of the M modules M_1 to M_M.

FIG. 7 is a diagram illustrating another example in which the storage system 10 according to embodiments of the present disclosure determines the thermal throttling level of M modules.

Referring to FIG. 7, the temperature handler circuit THC of the storage system 10 may collect a total of N temperature information pieces T1 to TN, one each from the N temperature sensors TS1 to TSN, as in FIG. 6.

In FIG. 7, the temperature handler circuit THC may calculate, for each of the M modules M_1 to M_M, a composite value by using the collected N temperature information pieces T1 to TN and a group of N weights for the corresponding one of the M modules M_1 to M_M. In this case, a group of the N weights applied to the calculation of the composite value CS for one of the M modules M_1 to M_M may also be different from another group of N weights for another module of the M modules M_1 to M_M.

First, for the module M_1, the temperature handler circuit THC may calculate the composite value $CS_1$ for the module M_1 using the N temperature information pieces T1 to TN and a group of N weights $w_{11}$ to $w_{1N}$ for the module M_1. In addition, the temperature handler circuit THC may calculate the composite value $CS_2$ for the module M_2 using the N temperature information pieces T1 to TN and a group of N weights $w_{21}$ to $w_{2N}$ for the module M_2. Furthermore, the temperature handler circuit THC may calculate the composite value $CS_3$ for the module M_3 using the N temperature information pieces T1 to TN and a group of N weights $w_{31}$ to $w_{3N}$ for the module M_3. Likewise, the temperature handler circuit THC may also calculate the composite value for the remaining modules.

This may be expressed by Equation 2 as follow.

$$CS_1 = T_1 * w_{11} + T_2 * w_{12} + T_3 * w_{13} + \ldots + T_N * w_{1N}$$

$$CS_2 = T_1 * w_{21} + T_2 * w_{22} + T_3 * w_{23} + \ldots + T_N * w_{2N}$$

$$CS_3 = T_1 * w_{31} + T_2 * w_{32} + T_3 * w_{33} + \ldots + T_N * w_{3N}$$

$$\ldots$$

$$CS_M = T_1 * w_{M1} + T_2 * w_{M2} + T_3 * w_{M3} + \ldots + T_N * w_{MN} \quad \text{[Equation 2]}$$

The temperature handler circuit THC may determine the thermal throttling level for each module by using a corresponding one among the M composite values $CS_1$, $CS_2$, $CS_3$, ~, $CS_M$ described above, and control operations of the M modules M_1 to M_M based on the determined thermal throttling level.

Therefore, the temperature handler circuit THC may control operations based on different thermal throttling levels for different modules, thereby enabling each module to perform thermal throttling at the most appropriate level and to efficiently execute thermal throttling. Specifically, the temperature handler circuit THC may increase the weight to be applied to a corresponding module generating a lot of heat, and as a result, may apply the high thermal throttling level to the corresponding module and prevent the rapid temperature increase of the corresponding module. In addition, the temperature handler circuit THC may lower the weight to be applied to a corresponding module generating less heat, and consequently apply the low thermal throttling level to the corresponding module so as to minimize the performance degradation caused by lowering the operating speed of the corresponding module.

Hereinafter, it will be described an example of determining a group of N weights applied for each of the M modules M_1 to M_M based on the case of the first module M_1 among M modules M_1 to M_M. The method described below may be applied equally to the remaining modules as well as the first module M_1.

Figure 8:
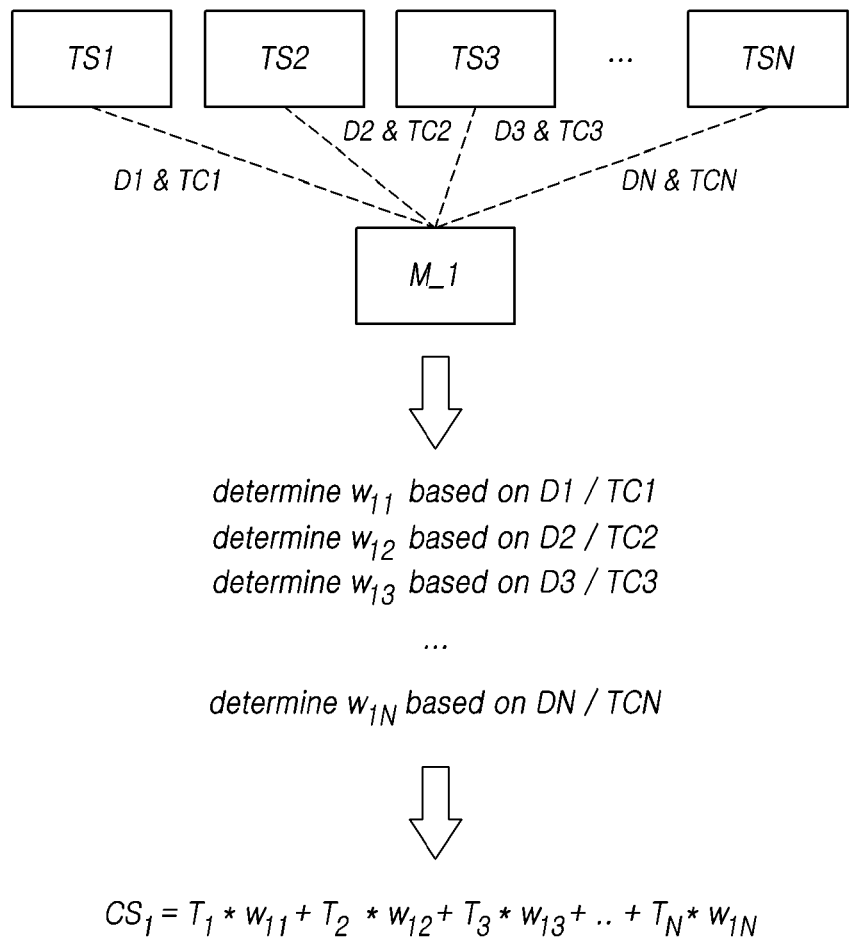
FIG. 8 is a diagram illustrating an example of determining a group of weights applied to the first module of FIG. 7.

FIG. 8 is a diagram illustrating an example of determining a group of N weights to be applied to the first module M_1 of FIG. 7.

Referring to FIG. 8, the temperature handler circuit THC may determine the group of N weights $w_{11}$ to $w_{1N}$ for the first module M_1 used to calculate the composite value CS1 for determining the thermal throttling level for the first module M_1 based on the distances and thermal conductivities between the first module M_1 and the respective N temperature sensors TS1 to TSN.

In FIG. 8, the distance between the module M_1 and the temperature sensor TS1 is D1 and the thermal conductivity between the module M_1 and the temperature sensor TS1 is TC1. In this case, the weight $w_{11}$ applied to the temperature information piece T1 collected by the temperature sensor TS1 may be determined based on D1 and TC1.

In addition, the distance between the first module M_1 and the temperature sensor TS2 is D2 and the thermal conductivity between the first module M_1 and the temperature sensor TS2 is TC2. In this case, the weight $w_{12}$ applied to the temperature information piece T2 collected by the temperature sensor TS2 may be determined based on D2 and TC2.

In addition, the distance between the first module M_1 and the temperature sensor TS3 is D3 and the thermal conductivity between the first module M_1 and the temperature sensor TS3 is TC3. In this case, the weight $w_{13}$ applied to the temperature information piece T3 collected by the temperature sensor TS3 may be determined based on D3 and TC3.

Similarly, the distance between the first module M_1 and the temperature sensor TSN is DN and the thermal conductivity between the first module M_1 and the temperature sensor TSN is TCN. In this case, the weight $w_{1N}$ applied to the temperature information piece TN collected by the temperature sensor TSN may be determined based on DN and TCN.

In this case, the distances and thermal conductivities between the first module M_1 and the respective N temperature sensors TS1 to TSN may be, for example, preset values in the manufacturing process of the storage system 10. At this time, the distance is a physical distance between the module and the temperature sensor, which can be measured at the manufacturing process.

The thermal conductivity may be measured at the manufacturing process by analyzing the material located between the module and the temperature sensor but may also be measured indirectly by comparing the temperature change of the module and the temperature change in the temperature information piece measured by the temperature sensor.

FIG. 9 is a diagram illustrating an example of determining thermal conductivities between the first module M_1 and respective N temperature sensors TS1 to TSN in FIG. 8.

Referring to FIG. 9, the thermal conductivities between the first module M_1 and the respective N temperature sensors TS1 to TSN may be determined based on information indicating a corresponding relationship between temperatures of the module M_1 and temperature information pieces measured by each of the N temperature sensors TS1 to TSN. In this case, the temperature of the first module M_1 may be a value measured by a separate device (e.g. a thermometer) different from the N temperature sensors TS1 to TSN.

In FIG. 9, when the temperature of the first module M_1 changes as 60→65→70→75→80, the values of the temperature information piece measured by the temperature sensor TS1 may change as 50→55→60→65→70, the value of the temperature information piece measured by the temperature sensor TS2 may change as 40→45→50→55→60, and the value of the temperature information piece measured by the temperature sensor TS3 may change as 45→49→52→56→62, and similarly, the value of the temperature information piece measured by the temperature sensor TSN may change as 48→51→54→58→63.

In this case, when comparing the temperature sensor TS1 and the temperature sensor TS2, the temperature information piece measured by the temperature sensor TS1 changes closer to the temperature of the first module M_1 than the temperature information piece measured by the temperature sensor TS2. Accordingly, the thermal conductivity between the temperature sensor TS1 and the first module M_1 may be determined to be higher than the thermal conductivity between the temperature sensor TS2 and the first module M_1.

The temperature handler circuit THC may calculate a degree of correlation between the temperature of the first module MD_1 and the temperature measured by each temperature sensor, and then calculate thermal conductivity based on the calculated degree of correlation.

Hereinafter, it will be described an example in which the temperature handler circuit THC determines the thermal throttling levels for the respective M modules M_1 to M_M.

Figure 10:
FIG. 10 is a diagram illustrating an example of determining the thermal throttling level for each module in FIG. 7.

FIG. 10 is a diagram illustrating an example of determining the thermal throttling levels for the respective M modules M_1 to M_M in FIG. 7.

Referring to FIG. 10, the temperature handler circuit THC may determine the thermal throttling level depending on a group of ranges in which the respective M composite values $CS_1$, $CS_2$, $CS_3$, ~, $CS_M$ calculated for the respective M modules M_1 to M_M belong to.

In FIG. 10, if the composite value is less than V1, the thermal throttling level is determined as 0, if the composite value is greater than or equal to V1 and less than V2, the thermal throttling level is determined as 1, if the composite value is greater than or equal to V2 and less than V3, the thermal throttling level is determined as 2, if the composite value is greater than or equal to V3 and less than V4, the thermal throttling level may be determined as 3, and if the composite value is greater than or equal to V4, the thermal throttling level may be determined as 4. In this case, V1<V2<V3<V4.

For example, the composite value $CS_1$ corresponding to the module M_1 is 67, the composite value $CS_2$ corresponding to the module M_2 is 72.5, the composite value $CS_3$ corresponding to the module M_3 is 85.75, V1 is 70, V2 is 75, V3 is 80, and V4 is 85. In this case, since 67<70, the thermal throttling level for module M_1 is 0, and since 70 72.5<75, the thermal throttling level for module M_2 is 1, and since 85.75≥85, the thermal throttling level for module M_3 is 4.

In FIG. 10, the single group of ranges of the composite value used to determine the thermal throttling level is described to be set equally for all of the M composite values $CS_1$ to $CS_M$. However, a group of the ranges of the composite value for determining the thermal throttling level may be set differently for each composite value or for each of the M modules M_1 to M_M.

FIG. 11 is a diagram illustrating another example of determining the thermal throttling level for each of the M modules M_1 to M_M in FIG. 7.

Referring to FIG. 11, the temperature handler circuit THC may determine the thermal throttling level according to M groups of ranges in which the respective M composite values $CS_1$ to $CS_M$ calculated for the respective M modules M_1 to M_M belong to.

Alternatively, unlike FIG. 10, the M groups of ranges of the composite value used to determine the thermal throttling levels for the respective M modules M_1 to M_M may be different for the respective M composite values. This is because, since each module has different temperatures to ensure normal operation, the timing at which the thermal throttling operation should be performed at a specific thermal throttling level may be different for each module.

In FIG. 11, for the composite value $CS_1$ corresponding to the module M_1, if the composite value $CS_1$ is less than V11, the thermal throttling level corresponding to the module M_1 is determined as 0, if the composite value $CS_1$ is greater than or equal to V11 and less than V12, the thermal throttling level corresponding to the module M_1 is determined as 1, if the composite value $CS_1$ is greater than or equal to V12 and less than V13, the thermal throttling level corresponding to the module M_1 is determined as 2, if the composite value $CS_1$ is greater than or equal to V13 and less than V14, the thermal throttling level corresponding to the module M_1 is determined as 3, and if the composite value $CS_1$ is greater than or equal to V14, the thermal throttling level corresponding to the module M_1 may be determined as 4.

In addition, for the composite value $CS_2$ corresponding to the module M_2, if the composite value $CS_2$ is less than V21, the thermal throttling level corresponding to the module M_2 is determined as 0, if the composite value $CS_2$ is greater than or equal to V21 and less than V22, the thermal throttling level corresponding to the module M_2 is determined as 1, if the composite value $CS_2$ is greater than or equal to V22 and less than V23, the thermal throttling level corresponding to the module M_2 is determined as 2, if the composite value $CS_2$ is greater than or equal to V23 and less than V24, the thermal throttling level corresponding to the module M_2 is determined as 3, and if the composite value $CS_2$ is greater than or equal to V24, the thermal throttling level corresponding to the module M_2 may be determined as 4.

Similarly, the thermal throttling levels may be determined for different composite values $CS_3$ to $CS_M$ using the different groups of ranges for the respective composite values.

Figure 12:
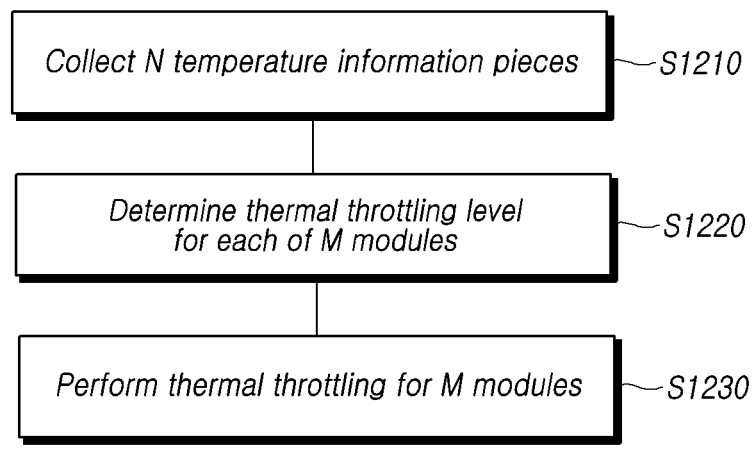
FIG. 12 is a diagram illustrating the operating method of the storage system according to embodiments of the present disclosure.

FIG. 12 is a diagram illustrating the operating method of the storage system 10 according to embodiments of the present disclosure.

Referring to FIG. 12, the operating method of the storage system 10 may include the operation of collecting N temperature information pieces T1 to TN from the N temperature sensors TS1 to TSN (S1210).

In addition, the operating method of the storage system 10 may include the operation of determining the thermal throttling level for each of the M modules M_1 to M_M based on N temperature information pieces T1 to TN and a group of N weights for each of the M modules M_1 to M_M (S1220).

In addition, the operating method of the storage system 10 may include the operation of performing the thermal throttling for each of the M modules M_1 to M_M based on the thermal throttling level for each of the M modules M_1 to M_M (S1230).

In the operation of determining the thermal throttling level for each of the M modules M_1 to M_M, the composite value may be calculated based on N temperature information pieces and a group of N weights for each of the M modules M_1 to M_M. In this case, a group of the N weights for the first module M_1 among the M modules M_1 to M_M may be determined based on the distances and the thermal conductivities between the first module M_1 and the respective N temperature sensors TS1 to TSN.

Thermal conductivities between the first module M_1 and the respective N temperature sensors TS1 to TSN may be determined based on information indicating the corresponding relationship between the temperature of the N temperature information pieces T1 to TN and the temperature of the first module M_1.

In the determining of the thermal throttling levels for the respective M modules M_1 to M_M, the different group of ranges of the composite values may be set, as described with reference to FIG. 11.

Figure 13:
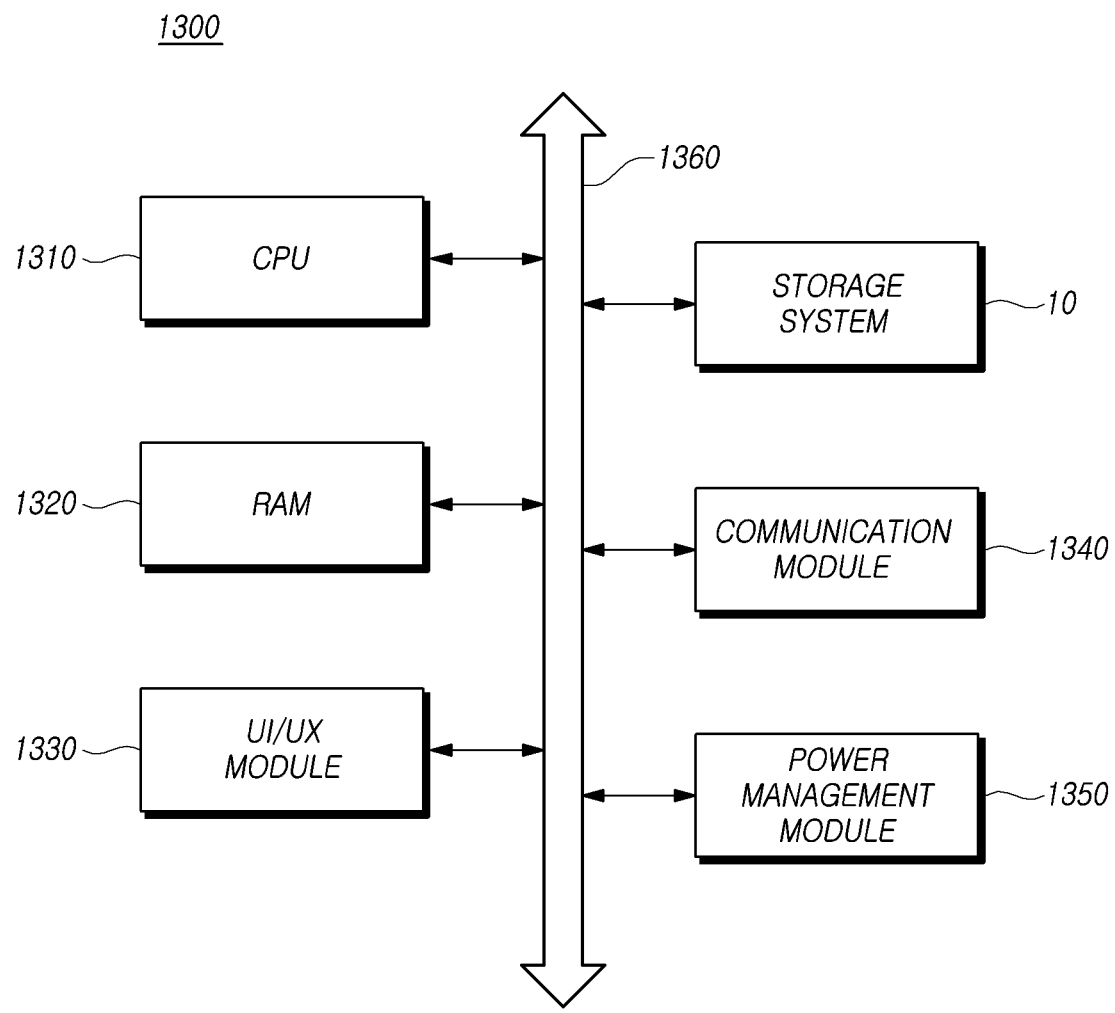
FIG. 13 is a diagram illustrating the configuration of a computing system based on some embodiments of the disclosed technology.

FIG. 13 is a diagram illustrating the configuration of a computing system 1300 based on an embodiment of the disclosed technology.

Referring to FIG. 13, the computing system 1300 based on an embodiment of the disclosed technology may include: a storage system 10 electrically connected to a system bus 1360; a CPU 1310 configured to control the overall operation of the computing system 1300; a RAM 1320 configured to store data and information related to operations of the computing system 1300; a user interface/user experience (UI/UX) module 1330 configured to provide the user with a user environment; a communication module 1340 configured to communicate with an external device as a wired and/or wireless type; and a power management module 1350 configured to manage power used by the computing system 1300.

The computing system 1300 may be a personal computer (PC) or may include a mobile terminal such as a smartphone, a tablet or various electronic devices.

The computing system 1300 may further include a battery for supplying an operating voltage, and may further include an application chipset, a graphic-related module, a camera image processor, and a DRAM. Other elements which would be apparent to a person skilled in the art, may also be included.

The storage system 10 may include not only a device configured to store data in a magnetic disk such as a hard disk drive (HDD), but also a device configured to store data in a nonvolatile memory such as a solid state drive (SSD), a universal flash storage device, or an embedded MMC (eMMC) device. The non-volatile memory may include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like. In addition, the storage system 10 may be implemented as storage devices of various types and mounted inside various electronic devices.

Based on embodiments of the disclosed technology described above, the operation delay time of the memory system may be advantageously reduced or minimized. In addition, based on an embodiment of the disclosed technology, an overhead occurring in the process of calling a specific function may be advantageously reduced or minimized. Although various embodiments of the disclosed technology have been described with particular specifics and varying details for illustrative purposes, those skilled in the art will appreciate that various modifications, additions and substitutions may be made based on what is disclosed or illustrated in this patent document. Accordingly, the memory system should not be limited based on the described embodiments. Rather, the memory system described herein should only be limited in light of the claims that follow when taken in conjunction with the above description and accompanying drawings.

What is claimed is:

1. A storage system comprising:
N temperature sensors, where N is natural number;
M modules, where M is natural number of 2 or more; and
a temperature handler circuit for performing thermal throttling for the M modules using N temperature information pieces collected from the N temperature sensors,
wherein the temperature handler circuit:
determines a thermal throttling level for each of the M modules based on the N temperature information pieces collected from the N temperature sensors and N weights corresponding to the N temperature sensors—the N weights different for each of the M modules, and
performs the thermal throttling for the M modules based on the thermal throttling levels for the M modules, respectively.

2. The storage system of claim 1, wherein the temperature handler circuit further calculates a composite value based on the N temperature information pieces and the N weights for each of the M modules in order to determine the thermal throttling level for each of the M modules.

3. The storage system of claim 2, wherein, when determining the thermal throttling level for a first module among the M modules, the temperature handler circuit further determines the N weights for the first module based on distances and thermal conductivities between the first module and the respective N temperature sensors.

4. The storage system of claim 3, wherein the temperature handler circuit further determines the thermal conductivities between the first module and the respective N temperature sensors based on information indicating a corresponding relationship between the N temperature information pieces and a temperature of the first module.

5. The storage system of claim 1, wherein, when determining the thermal throttling level for each of the M modules, the temperature handler circuit sets M range groups of the composite values for the M modules, respectively.

6. An operating method for a storage system including N temperature sensors and M modules, where N is natural number and M is natural number of 2 or more, the operating method comprising:
collecting N temperature information pieces from the N temperature sensors;
determining a thermal throttling level for each of the M modules based on the N temperature information pieces and N weights corresponding to the N temperature sensors—the N weights different for each of the M modules; and performing the thermal throttling for the M modules based on the thermal throttling levels for the M modules, respectively.

7. The operating method of claim 6, wherein the determining the thermal throttling level for each of the M modules includes calculating a composite value based on the N temperature information pieces and the N weights for each of the M modules.

8. The operating method of claim 7, wherein the determining the thermal throttling level for each of the M modules includes determining N weights for the first module based on distances and thermal conductivities between the first module and the N respective temperature sensors.

9. The operating method of claim 8, wherein the determining the thermal throttling level for each of the M modules includes determining the thermal conductivities between the first module and the respective N temperature sensors based on information indicating a corresponding relationship between the N temperature information pieces and a temperature of the first module.

10. The operating method of claim 6, wherein the determining the thermal throttling level for each of the M modules includes setting M range groups of the composite values for the M modules, respectively.

11. A system comprising:

modules respectively disposed at physical locations;

N temperature sensors respectively disposed at physical locations and each suitable for generating a temperature information piece by sensing temperatures of the modules;

a thermal throttling controller suitable for performing a thermal throttling operation on a selected one of the modules based on the N temperature information pieces and N weights for the selected module, wherein each of the N weights are determined according to a pair of distance and thermal conductivity between the selected module and a corresponding one of the N temperature sensors, where N is a natural number.

* * * * *